United States Patent
Davies et al.

[15] 3,635,740
[45] Jan. 18, 1972

[54] BASIC REFRACTORY SHAPES

[72] Inventors: Ben Davies, Pittsburgh; George R. Henry, Bethel Park, both of Pa.

[73] Assignee: Dresser Industries, Inc., Dallas, Tex.

[22] Filed: Apr. 1, 1970

[21] Appl. No.: 24,871

[52] U.S. Cl. ................................................................. 106/59
[51] Int. Cl. ............................................................. C04b 35/42
[58] Field of Search ........................................................ 106/59

[56] References Cited

UNITED STATES PATENTS

| | | | |
|---|---|---|---|
| 3,429,723 | 2/1969 | Maier et al. | 106/59 |
| 3,522,065 | 7/1970 | Herron | 106/59 |
| 3,535,134 | 10/1970 | Martinet et al. | 106/59 |

*Primary Examiner*—James E. Poer
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

Fired basic refractory shapes made from refractory brickmaking size-graded batches consisting of magnesite and chrome ore, the improvement being the inclusion of fireclay in the batch in amounts up to about 5 percent, by weight, and the two stage burning of resulting shapes to obtain high hot strength.

4 Claims, No Drawings

BASIC REFRACTORY SHAPES

Refractories made from a mixture of dead-burned magnesite and chrome ore hold an important place in industry. These refractories are generally divided into those which have a predominance of chrome ore and those having a predominance of magnesia. This invention is particularly concerned with those having a predominance of magnesia, although it is not limited thereto, and to refractory structures which they are used to fabricate. Both of the foregoing types of refractories are referred to in the art as basic refractories There are various commercial versions of them, which are normally sold as chemically bonded, unburned refractories, or as burned refractories. This invention relates particularly to the latter.

Despite the technical advances of contemporary workers, burned basic refractory shapes or brick of the magnesite-chrome ore-type are characterized by relatively low strength, somewhere within the temperature range of use. It is not uncommon for their modulus of rupture to be less than 600 p.s.i. at room temperature, less than 200 p.s.i. at 2,300° F., and even weaker at higher temperatures. In other cases, the brick may be quite strong at room temperatures (1,000–1,500 p.s.i.), but no stronger at room temperatures than the figures just cited.

The foregoing is discussed in detail in U.S. Pat. No. 3,199,994, entitled "Refractory Structure and Shapes Therefor," owned by the same assignee as the instant invention. In this patent, means is provided for obtaining excellent fired basic refractory shapes at burning temperatures of 2,900° and, preferably, 2,950° F.

One method for obtaining high strength is by carefully controlling the chemical analyses of the chrome ore and magnesite, which are used to make the magnesite-chrome shapes, and making minor additions of finely divided titania or titania-containing compounds to increase the hot strength of such shapes without deleteriously affecting other desirable properties.

Accordingly, it is an object of this invention to provide improved, fired, basic refractory shapes of the magnesia-chrome-type.

It is another object of the invention to provide improved, fired, magnesite-chrome shapes having good strength at elevated temperatures.

In accordance with the present invention, there is provided a method for producing basic refractory shapes having good high temperature (i.e., 2,700° F.) strength as measured by modulus of rupture. A size-graded batch is prepared consisting essentially of dead-burned magnesite and low-silica chrome ore. To the batch is added up to 5 percent, based on the total weight of the batch, of siliceous fireclay. The minimum should be about 0.5 percent. The batch is then compressed into shapes and the shapes are fired at a temperature below about 3,000° F. After cooling the shapes, they are then fired at a temperature above about 3,000° F.

Shapes so formed have a modulus of rupture of at least about 1,000 p.s.i. at 2,700° F.

The preferred first-stage firing temperature ranges between about 2,800 and 2,950° F., while the second stage firing temperature ranges between about 3,050 and 3,200° F. This latter high firing temperature is utilized to promote direct bonding between the chrome ore spinel particles and magnesite particles. The phenomenon of direct bonding or direct attachment of magnesite to chrome ore is disclosed in U.S. Pat. Nos. 3,180,743 and 3,180,744, assigned to the present assignee, and these are incorporated herein by reference.

In initial experiments with brick-containing magnesite, chrome ore and siliceous fireclay, it was discovered that the brick could not be fired directly at temperatures over 3,000° F. The $SiO_2$ in the shape reacted with other compounds contained by the magnesite, chrome ore and fireclay, apparently to form liquid silicates which caused the shapes to soften and to deform excessively. Also, the high hot strengths desired could not be realized. By first firing the shapes below 3,000° F., the $SiO_2$ reacts with the other compounds in the raw materials, i.e., CaO, MgO, to form forsterite, monticellite and the like. No doubt the liquid silicates still form, but these resulting minerals are developed to stabilize the structure, so that a second firing to above 3,000° F. is not accompanied by the destructive degree of softening which occurred when these higher temperatures were obtained in a one-step firing. The first-stage firing temperature should not be below about 2,800° F.

After cooling from the first firing, the shapes may then be fired to direct bonding temperatures without fear of excessive deformation. The hold time at any given temperature will vary, as is well known to those skilled in the art.

As is understood by those skilled in the art, to improve cold strength of chrome-magnesite shapes, one need merely increase the quantity of chrome ore. Thus, the strongest sudden variations in temperature which room temperature) brick of this type, which can be made from the group of basic materials chrome ore and magnesite, is ordinarily a fired brick made of 99+ percent chrome ore. Perhaps one of the most distressing properties of very high chrome ore content refractories is low refractoriness, as measured by inability to support load at high temperatures. On the other end of the range of possible mixtures is the fired 100 percent magnesite shape, which has excellent resistance to basic open hearth slags and the like, but which is frequently characterized by poor resistance to sudden variations in temperature which cause extensive spalling of such shapes. Magnesite-chrome brick have come to be recognized by some in the art as a balance of the desirable properties of each and in some instances properties superior to either, and having particular utility in building open hearth furnaces or electric steelmaking furnaces. Our current work has shown a mixture of about 60 percent dead-burned magnesite and about 40 percent low-silica chrome ore to be an optimum mixture for many purposes, with a very good range being 50 to 80 percent magnesite—20 to 50 percent chrome ore, with a permissible range of 20 to 80 percent mangesite—80 to 20 percent chrome ore. It is with this range that our invention is particularly concerned.

By the term "siliceous clay," it is intended to mean a fireclay analyzing more than about 60 percent $SiO_2$ on a calcined basis.

It should be understood that the following examples are but illustrative of the best mode now known to us for the practice of our invention, but we do not wish to be limited thereto but, rather, wish it understood that the true measure and scope of the invention is as defined in the hereafter appended claims. Also, unless otherwise stated, all chemical analyses given herein are on the basis of an oxide analysis, in conformity with the conventional practices of reporting the chemical analysis of refractory materials. All parts and percentages are by weight, and all size-grading is according to the standard Tyler series. Also, all chemical analyses and size-grading should be considered but typical.

EXAMPLE I

A batch was prepared which consisted of 40 parts Philippine chrome ore concentrates and 60 parts dead-burned magnesite. About one-half of the chrome ore was −14 +28 mesh and the other half was −28 mesh. Of the magnesite, a −4 +8 mesh fraction constituted 30 percent of the batch. The remainder of the magnesite was ball mill fines, i.e., mostly −150 mesh. We divided this batch into 4 equal portions. To the first, we added 1 percent of ball clay; to a second, we added 3 percent ball clay; and to a third, we added 4 percent ball clay. We used the fourth portion as a standard; it contained no clay. We tempered the batch with about 3 percent lignin liquor, and small amounts of boric acid, creosote and water were also added. The batches were pressed into shapes on a power press at about 8,000 p.s.i. All of the shapes were then fired at cone 23 (about 2,920° F.). After cooling, they were refired at cone 34 (about 3,150° F.). After cooling, the shapes were subjected to physical testing. The standard had a bulk density of about 185 p.c.f., and the clay-containing shapes, respectively, 1 percent, 3 percent and 4 percent, had a bulk density of 186, 186 and 184. The modulus of rupture at 2,700° F. of these four respective types of shapes was 780, 1,200, 1,430 and 1,540 p.s.i. Thus, the 4 percent clay addition gave a modulus of rupture at 2,700° F. which was almost 100 percent better than that of the standard, which was only 780 p.s.i. The 1 percent clay addition gave a 54 percent increase over the standard and the 3 percent addition gave an increase of 83 percent. The apparent specific gravity and porosity were about the same for all mixes. Thus, the clay addition had little or no effect on these properties.

EXAMPLE II

Another batch is prepared containing about 80 percent dead-burned magnesite and about 20 percent of the Philippine chrome ore concentrates. The overall size-grading is about the same as that discussed under example I. The batch is again divided into 4 portions and the clay additions are made as in the above example. The batches are formed into shapes, as above, and the physical properties are measured.

EXAMPLE III

Another batch is prepared consisting of about 40 percent dead-burned magnesite and about 60 percent of the Philippine chrome ore concentrates. The overall sizing is about the same as in example I. This batch is also divided into 4 portions, and the clay additions are made as in example I. The shapes are formed into brick and are physically tested.

EXAMPLE IV

The batch is prepared consisting of about 20 percent dead-burned magnesite and about 80 percent Philippine chrome ore concentrates. The batches are treated as in the foregoing examples.

The dead-burned magnesite used in the above tests was similar to that manufactured according to the techniques of U.S. Pat. No. 3,060,000, analyzing about 98 percent MgO, the remaining 2 percent being $SiO_2$, $Fe_2O_3$, $Al_2O_3$, ignition loss and trade impurities. The Philippine chrome ore concentrates and the ball clay (ignition-free basis) had chemical analyses substantially as shown in the table below.

|  | Chrome Ore | Ball Clay |
| --- | --- | --- |
| $SiO_2$ | 2.3% | 67.1% |
| $Al_2O_3$ | 30.0 | 25.1 |
| $TiO_2$ |  | 1.3 |
| $Fe_2O_3$ | 12.6 | 3.0 |
| $Cr_2O_3$ | 33.0 |  |
| CaO | 0.6 | 0.1 |
| MgO | 19.0 | 0.8 |
| Alkalies |  | 2.6 |
| Ignition loss |  | 2.5 |

Of course, other dead-burned magnesites and chrome ores may be used. The essential requirement is a chemical one; namely, that the total $SiO_2$ contribution of these two ingredients be less than 5 percent, and, preferably, less than 2 percent. There are quite a number of other siliceous fireclays that may be employed, too numerous to mention. However, it is preferred that the clay selected be of a plastic type to provide a batch with good forming characteristics at the press.

Having thus described the invention in detail and with sufficient particularity as to enable those skilled in the art to practice it, what we desire to have protected by Letters Patent is set forth in the following claims.

We claim:

1. A method for producing basic refractory shapes having good high-temperature strength comprising preparing a batch consisting essentially of from 20 to 80 percent, by weight, magnesite and from 80 to 20 percent, by weight, chrome ore and from about 0.5 percent to about 5 percent, based on the total weight of the magnesite and chrome ore, of siliceous fireclay, forming the batch into shapes, firing the shapes at a temperature below about 3,000° F. but sufficiently high to react substantially all $SiO_2$ contained by the magnesite, chrome ore and fireclay with other compounds contained therein, cooling the shapes, and subsequently firing the shapes at a temperature above about 3,000° F.

2. Method according to claim 1 in which the total $SiO_2$ contributed by the magnesite and chrome ore is less than about 5 percent by weight.

3. Method according to claim 1 in which the siliceous fireclay is a ball clay.

4. A fired, basic refractory shape consisting essentially of chrome ore and magnesia, said shape having a modulus of rupture at 2,700° F. of at least about 1,000 p.s.i., said shape made from a batch consisting of 50 to 80 percent, by weight, magnesite and 20 to 50 percent, by weight, chrome ore, and siliceous fireclay in amounts from about 0.5 percent to about 5 percent, based on the total weight of magnesite and chrome ore.

* * * * *